United States Patent
Biswas et al.

(10) Patent No.: US 9,081,937 B2
(45) Date of Patent: Jul. 14, 2015

(54) SYSTEMS AND METHODS FOR MANAGING SUBSCRIPTION-BASED LICENSING OF SOFTWARE PRODUCTS

(75) Inventors: Sanjeev Kumar Biswas, Ghaziabad (IN); Kanika Dalmia Gupta, New Delhi (IN); Vikalp Gupta, New Delhi (IN); Daniel C. Brotsky, Berkeley, CA (US); Wei Cheng, San Jose, CA (US); Vivek Misra, San Jose, CA (US); Yashodhan B. Gokhale, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 455 days.

(21) Appl. No.: 12/868,803

(22) Filed: Aug. 26, 2010

(65) Prior Publication Data

US 2012/0054107 A1  Mar. 1, 2012

(51) Int. Cl.
 G06F 21/00 (2013.01)
 G06F 21/10 (2013.01)
 G06Q 30/06 (2012.01)

(52) U.S. Cl.
 CPC ............... *G06F 21/10* (2013.01); *G06Q 30/06* (2013.01)

(58) Field of Classification Search
 USPC .......................................................... 705/59
 See application file for complete search history.

(56) References Cited

U.S. PATENT DOCUMENTS

2004/0054711 A1* 3/2004 Multer ......................... 709/201
2012/0005041 A1* 1/2012 Mehta et al. ................ 705/27.1

FOREIGN PATENT DOCUMENTS

EP     2200041 A1 *  6/2010   ............ G11B 27/34

OTHER PUBLICATIONS

Search Report dated Jan. 24, 2012 in European Patent Application No. 11177368.5.
Statement in accordance with the Notice from the European Patent Office dated Oct. 1, 2007 concerning business methods (OJ EPO Nov. 2007, 592-593), 03 pages (2007) Abstract.

* cited by examiner

*Primary Examiner* — James A Reagan
(74) *Attorney, Agent, or Firm* — Kilpatrick Townsend & Stockton LLP

(57) ABSTRACT

One exemplary embodiment provides a synchronization device for updating information stored at a first device used for account management of a subscription for a software product. The synchronization device receives a status of the subscription from a second device that provides billing transactions associated with the subscription. The second device maintains the status of the subscription to reflect changes based on the billing transactions associated with the subscription. Based at least in part on the status of the subscription received at the synchronization device from the second device, the synchronization device provides information for the first device to update a status of the account associated with the subscription.

17 Claims, 5 Drawing Sheets

500

```
┌─────────────────────────────────────────┐
│ PROVIDE A SYNCHRONIZATION DEVICE FOR    │
│ UPDATING INFORMATION STORED AT A DEVICE │
│ USED FOR ACCOUNT MANAGEMENT OF A        │
│ SOFTWARE PRODUCT SUBSCRIPTION           │
│                                     510 │
└─────────────────────────────────────────┘
                    │
                    ▼
┌─────────────────────────────────────────┐
│ RECEIVE A STATUS OF THE SUBSCRIPTION AT │
│ THE SYNCHRONIZATION DEVICE, THE STATUS  │
│ RECEIVED FROM A DEVICE THAT PROVIDES    │
│ BILLING TRANSACTIONS ASSOCIATED WITH    │
│ THE SUBSCRIPTION                        │
│                                     520 │
└─────────────────────────────────────────┘
                    │
                    ▼
┌─────────────────────────────────────────┐
│ UPDATE A STATUS OF AN ACCOUNT FOR THE   │
│ SUBSCRIPTION STORED AT THE DEVICE USED  │
│ FOR ACCOUNT MANAGEMENT                  │
│                                     530 │
└─────────────────────────────────────────┘
```

FIGURE 5

SYSTEMS AND METHODS FOR MANAGING SUBSCRIPTION-BASED LICENSING OF SOFTWARE PRODUCTS

FIELD

This disclosure relates generally to computer software that runs, displays, provides, shares, or otherwise uses electronic content.

BACKGROUND

Software applications are typically provided under a variety of different purchase and licensing arrangements. Under certain subscription-based licensing arrangements, a person purchases a subscription and then is entitled to use the software product during the subscription period. Once the subscription period ends or expires, the software is no longer usable by the subscription purchaser. The software itself may include logic or functionality such that, after the expiration of the subscription, the software is no longer usable. In such circumstances, the software may provide a notice that renewal of the subscription is necessary for continued use of the software. The purchaser may then renew the subscription. The software can identify that such renewal has occurred in various ways. For example, the purchaser may enter or otherwise provide a subscription or renewal number or otherwise allow the software to confirm that renewal has occurred by providing information about the renewal. After renewal of the subscription, the software again allows use of the software's functionality until the subscription period again lapses or otherwise has a negative status, such as, for example, suspended, etc.

Software providers have also used third-parties to facilitate the purchase of software subscriptions. For example, such a third-party may operate a website software store that allows a consumer to purchase or renew software or otherwise pay for software services. The third-party may also maintain billing account information for the subscription purchaser and otherwise manage information associated with the purchaser and the software subscribed to by the purchaser. However, existing techniques for managing software subscriptions generally do not adequately allow software providers to have access to information and otherwise manage subscriptions to the software that they provide. This is due to the fact that such managing of subscriptions can require accessing information that is available only to the third-party that performs the billing functions. Moreover, existing techniques for validating that software used on a device has not expired can excessively slow performance of the software because such validation may require that the software wait for confirmation from an overused or otherwise slow billing server. From the billing server's perspective, having to validate, control, or otherwise manage the use of the subscribed-to software can require an undesirable amount of communication and processing activities. Thus, existing techniques for validating that software used on a device has not expired can burden the servers involved in providing the billing transactions associated with the subscriptions. While it is desirable to separate billing functions from validating, controlling, or otherwise managing software use, existing systems have not separated such functions from billing generally because such functions require access to current information about the subscription that is available only to the billing servers.

SUMMARY

One exemplary embodiment provides a synchronization device for updating information stored at a first device used for account management of a subscription for a software product. The synchronization device receives a status of the subscription from a second device that provides billing transactions associated with the subscription. The second device maintains the status of the subscription to reflect changes based on the billing transactions associated with the subscription. Based at least in part on the status of the subscription received at the synchronization device from the second device, the synchronization device provides information for the first device to update a status of the account associated with the subscription.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, aspects, and advantages of the present disclosure are better understood when the following Detailed Description is read with reference to the accompanying drawings, where:

FIG. 5 is a flow chart of an exemplary method of updating information stored at a device used for account management of a subscription for a software product.

DETAILED DESCRIPTION

Figure 1:
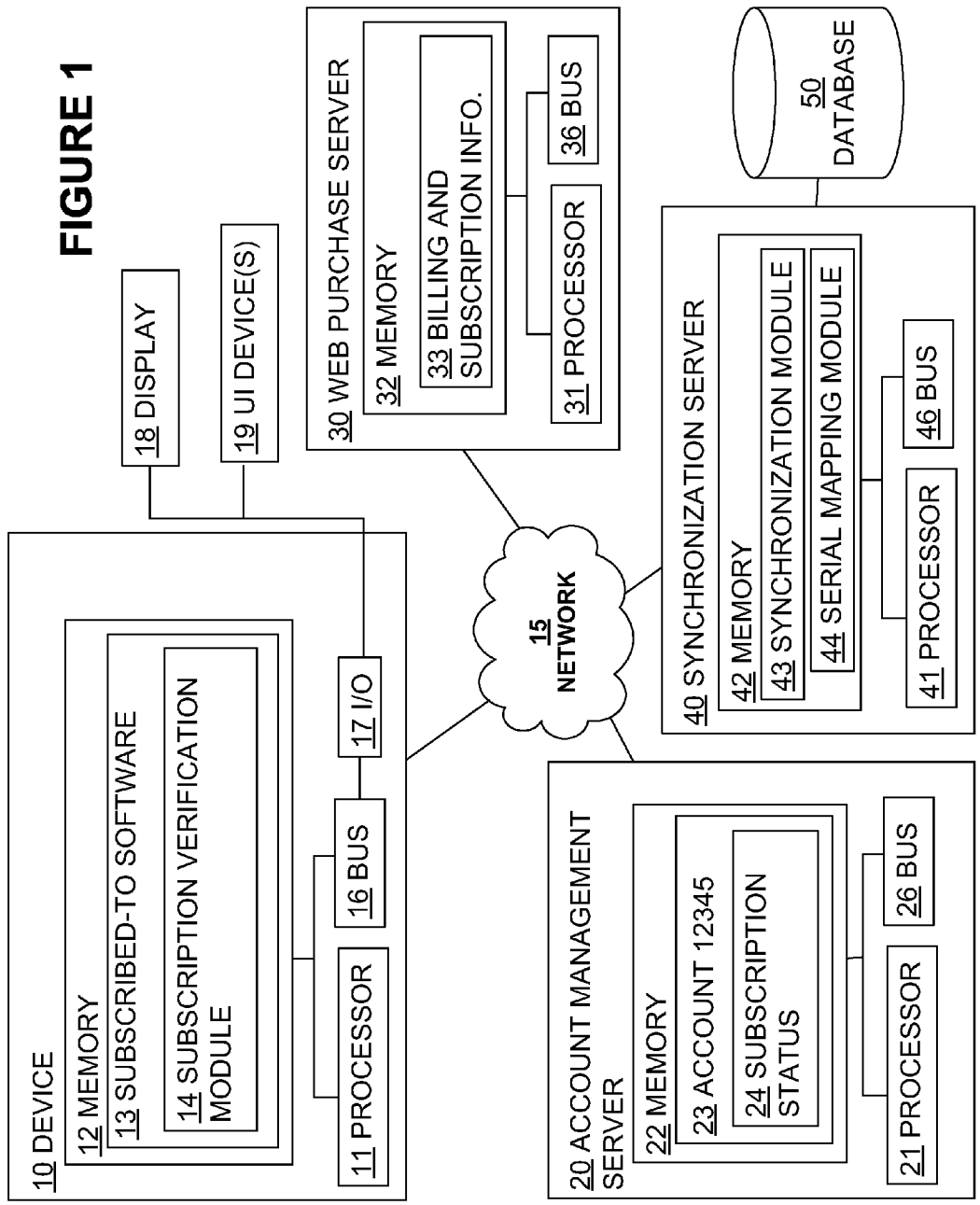
FIG. 1 depicts an exemplary computing environment for controlling the use of software subject to subscription.

Methods and systems are disclosed that facilitate software subscription management. In certain exemplary embodiments, purchasing and/or other billing-related processes associated with a software subscription are separated from account management processing. For example, a person may purchase a subscription to a software provider's software product from a web-based purchasing or other billing-related process. Such a billing-related process may or may not be operated by an entity other than the software provider. In either circumstance, other processes used to manage the software subscription may be separated from the billing-related processes. For example, control over whether the software executes or is prevented from executing in accordance with the subscription's status (e.g., active, expired, suspended, etc.) may be performed using account management components that are separate from the billing-related components. Thus, a software application can validate that a subscription to use the application is still current by accessing the account management components and thus without burdening the separate billing-related processes.

Since such separation creates the potential for discrepancies or other inconsistencies between the separated components, one or more synchronization components and/or processes are implemented to synchronize information in the billing-related components with information in the separate account management components. For example, subscription status information that may change as a result of a payment made through a web-based purchasing server may be synchronized with subscription status information for an associated account that is maintained on a separate account management server. As another example, a synchronization server may further address software version differences and corresponding software product serial number differences that may result from updates recognized by an account management server but not recognized by a web-based purchasing service and vice versa.

Software subscription management systems and methods are provided that allow software subscription billing-related processes to be separated from other subscription management functions. A web service used for purchasing and other billing-related transactions may provide web-based interfaces for those transactions and store information about the subscriptions created by or otherwise affected by those transactions. Separately, other processes may be provided to manage the software subscriptions, for example, by providing subscription status information used to control whether the software executes or is prevented from executing in accordance with subscription status. In such an exemplary scenario, the billing-related information is separated from, but synchronized with, similar information maintained by separate account management components. For example, subscription status information that changes as a result of a payment made through a purchasing server may be synchronized with subscription status information for an associated account that is maintained on a separate account management server.

In one exemplary scenario, a person purchases a software product from a web-based store. The web-based store provides a serial number to the purchaser to be used to license the product for a subscription period. The purchaser installs the software product on the person's personal computing device, for example, by downloading it from the software provider. During product launch, the purchaser is prompted to enter the serial number on a serialization screen. The serial number is then associated with a service object account or other account that is created on an account management server. Any subsequent changes to the subscription status resulting from interaction with the web-based store, as examples, cancellations, subscription renewals, subscription expirations, are monitored and the information stored on the account management server is updated accordingly. For example, a synchronization server may monitor the information tracked by the web based store to identify information. The synchronization server may use this information to initiate updating on the account management server, for example, by sending a message to the account management server. Monitoring, providing updates, and other synchronization functions provided by a synchronization server may operate as batch processes, event-driven processes, and otherwise. For example, a synchronization server may provide an update function by implementing a batch update, an event-driven update process, or otherwise as may be appropriate depending on system requirements.

Generally, among other things, embodiments disclosed herein provide new systems and methods for managing subscription-based licensing of software products. New systems and methods improve software provider access to information and control of subscriptions while allowing the software provider to also take advantage of billing and other services provided by other parties or to migrate from using such third-party services over time. One exemplary embodiment comprises an account management service and a synchronization service that provide various functions separate from the billing-related service, such as one that provides a web-based purchasing interface. Such user account management and synchronization services can be provided by a software provider itself or another entity.

In an exemplary embodiment, the account management service stores information about a subscription account including account status information. A device executing the subscribed-to software can check the account management service to ensure that the subscription associated account is active prior to allowing use of the software on the devices. The synchronization service can periodically or otherwise synchronize subscription account status information between the account management service and the separate billing service. Thus, if a person fails to pay for a renewal using the billing service, the synchronization service updates the account to be expired. For example, the synchronization service can update the account management service to ensure that the person's access to the software does not continue.

In certain embodiments, the validation service accesses user account information and then compares that information with information that it has retrieved from a billing-related service. One exemplary embodiment involves retrieving information in a single block or batch, i.e., requesting records for multiple accounts from the user account information service with a single request. As a specific example, a single request may result in the first ten accounts being sent, the next request resulting in the following ten accounts, etc. Generally, the communications between the various components can be structured to improve efficiency as may be appropriate for the particular system requirements.

Separating the features described above can provide various advantages. For example, by separating a subscription synchronization process from user account management services, various performance delays and potential overloading issues may be avoided. In certain embodiments, separating billing, account management, and synchronization features can reduce or minimize non-billing related access to one or more devices that provide the billing functionality, which may improve the functionality and performance of those products for billing-related functions. In one exemplary embodiment, only a few, or even a single, batch-type access to a billing device is made each day to retrieve all subscription information for one or more software providers. In other exemplary embodiments, information is pushed or otherwise event-driven.

FIG. 1 depicts an exemplary computing environment for controlling the use of software subject to subscription. The methods and systems disclosed herein are also applicable on other computing systems and environments. The environment shown in FIG. 1 comprises a wired or wireless network 15 connecting various devices 10, 20, 30, 40. In one embodiment, the network 15 comprises the Internet. In other embodiments, other networks, intranets, or combinations of networks may be used. Alternative configurations are possible.

As used herein, the term "device" refers to any computing or other electronic equipment that executes instructions and includes any type of processor-based equipment that operates an operating system or otherwise executes instructions. A device will typically include a processor that executes program instructions and may include external or internal components such as a mouse, a CD-ROM, DVD, a keyboard, a display, or other input or output equipment. Examples of devices are personal computers, digital assistants, personal digital assistants, cellular phones, mobile phones, smart phones, pagers, digital tablets, laptop computers, Internet appliances, other processor-based devices, and television viewing devices. Exemplary devices 10, 20, 30, 40 are respectively used as special purpose computing devices to provide specific functionality offered by their respective applications and by the interaction between their applications. As an example, device 10 is shown with a display 18 and various user interface devices 19. A bus, such as bus 16, bus 26, bus 36, or bus 46, will typically be included in a device as well.

As used herein, the term "application" refers to any program instructions or other functional components that execute on a device. An application may reside in the memory of a device that executes the application. As is known to one of skill in the art, such applications may be resident in any suitable computer-readable medium and execute on any suitable processor. For example, as shown the devices 10, 20, 30, 40 each comprise a computer-readable medium such as memory 12, 22, 32, 42 coupled to a processor 11, 21, 31, 41 that executes computer-executable program instructions and/or accesses stored information. Such processors 11, 21, 31, 41 may comprise a microprocessor, an ASIC, a state machine, or other processor, and can be any of a number of computer processors. Such processors comprise, or may be in communication with a computer-readable medium which stores instructions that, when executed by the processor, cause the processor to perform the steps described herein.

As used herein, the term "server" refers to an application that listens for or otherwise waits for requests or a device that provides one or more such applications that listens for or otherwise waits for requests. Synchronization server 40 is an example of a server. As used herein the phrase "synchronization server" refers to any server that provides synchronization between separately-stored data or information. A synchronization server may facilitate updating one or both of the separately-stored data or information, for example, by providing information that results in the updating of one or both of the separately-stored data or information.

A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

In FIG. 1, device 10 is a device that is used to execute or otherwise use subscribed—to software 14. The subscribed-to software 14 may provide software functionality on the device 10, including as an example but not limited to or requiring, functionality that provides user interface on display 18 and that receives interactions from one or more persons controlling the device 10 with UI devices 19 or otherwise using the device 10.

Subscribed-to software 14 is available for use on the device 10 according to a subscription account record 23 that is maintained on the account management server 20. Exemplary account information includes an account number, identification of one or more persons that may use the software according to the account, and/or information identifying one or more devices upon which the software may be used according to the account. For example, exemplary account management server 20 may maintain a subscription account record 23 labeled, "ACCOUNT 12345" in FIG. 1, for an account that allows the subscribed-to software to be used on device 10. This is merely an example of account information that can be maintained by account management server 20. The following further illustrates a data structure of a service account object as an example of an account record maintained on an account management server:

```
struct ServiceAccount
{
    Char acctIdent [STRING_MAX_LEN];
    // Account identifier
    Char acctStatusCode[STRING_MAX_LEN];
    // Status of subscription
    Char ownerGUID[STRING_MAX_LEN];
    // Software provider ID or User ID
    Char delegateGUID[STRING_MAX_LEN];
    Char ownerAuthSrc[STRING_MAX_LEN];
    Char delegateAuthSrc[STRING_MAX_LEN];
    Char serviceCode[STRING_MAX_LEN];
    Char serviceLevel[STRING_MAX_LEN];
}
```

Additional information may also be maintained or alternative information may be substituted for the exemplary information provided in this example.

The subscribed-to software 13 on device 10 can be configured in various ways to receive information from the account management server to determine whether the subscribed-to software should be provided on the device 10 or not, e.g., by identifying whether the subscription associated with the account is active, expired, suspended, etc. In the exemplary embodiment of FIG. 1, subscribed-to software 13 confirms that a subscription associated with the account has not expired with the account management server prior to allowing use of its functionality on the device.

In one exemplary subscription status verification technique, when the subscribed-to software 13 is initiated or executed on the device 10, subscription verification module 14 of subscribed-to software 13 sends a request though the network 15 to the account management server asking whether the associated account has expired or not. The account management server 20 checks account record 23 to determine the answer to the request. For example, the account record 23 may include subscription status 24 that identifies the state of the subscription, as examples, specifying whether and/or when the subscription was initiated, last renewed, expires, etc. Using such information, account management server 20 can respond through network 15 to the subscription verification module 14 of the subscribed-to software 13 on device 10.

In certain embodiments, the subscription verification process occurs at the startup or initiation of execution of the subscribed-to software 13 and none or limited portions of the functionality of the subscribed-to software 13 are accessible while the subscription verification process occurs. However, once the subscription status has been validated by subscription verification module 14, the full functionality of the subscribed-to software is then made available on the device. If the subscription status is expired or otherwise negative, the subscribed-to software application can provide a notice and/or instructions regarding the necessity of renewing the subscription or otherwise taking action to restore the subscribed-to software account status to valid and thereby restore the functionality of the subscribed-to software application 13 on the device.

The exemplary subscription verification process and other similar subscription verification processes can be performed under various verification schedules and conditions. For example, subscription verification may be implemented at every startup or initiation of execution of the subscribed-to software 13. Every time the software is executed, the subscription verification module may verify subscription status. In some computing environments, a device, such as device 10, may have only occasional access to network 15 and therefore only occasional access to the account management server 20 information. Subscription verification may be configured to occur in light of such occasional access. For example, every time the software is executed while network 15 is available, the subscription verification module may verify subscription status.

Similarly, the subscription verification module 14 may be configured to verify subscription status periodically, for example, at most once a week. In this example, the subscription module 14 would not verify subscription status again if the subscription status was already verified earlier that week. Subscription verification module 14 may be configured to deny access to functionality of the subscribed-to software if a predetermined length of time has occurred without network access. For example, if the device is removed from network access for an extended period of time, such as three months, the subscription verification module 14 may deny use of some or all of the functionality of the subscribed-to software 13 on the device 10 until subscription can again be verified. In such circumstances, a notification and/or instructions may be provided to facilitate subscription validation, for example, by providing an instruction to connect to network 15 so that subscription status can be verified.

In the example of FIG. 1, the subscription verification module 14 is illustrated as a module within subscribed-to software 13. In other embodiments, a subscription verification module can be provided in a different application or as a stand-alone application. In one exemplary embodiment, a subscription verification module is provided that provides subscription verification for multiple subscribed-to applications provided on a device. Such multiple subscribed-to applications may be associated with a single or multiple accounts on account management server 20 and may be accessed by such a subscription verification module individually or during a single request, for example, checking the subscription status of all of the subscribed-to software on the device at some periodic interval.

Accounts on the account management server 20 can be created in various ways. In one exemplary embodiment, device 10 is used to create an account such as account 23 on the account management server 20. For example, subscribed-to software may be downloaded to device 10 and executed for a first time. Executing the subscribed-to software may trigger an initial account creation interface to be displayed on device 18. Such an interface may prompt for input including, but not limited to, a serial number associated with a subscription to the subscribed-to software. Such a serial number could be obtained in various ways. In one example, a serial number is obtained through a purchase transaction conducted using a web purchase server 30 through use of which a software subscription is obtained in exchange for payment. The exemplary initial account creation interface may also accept input relating to user and/or device information as well as for input relating to account login information, for example, by requesting a user name and password. This information can be used to create an associated account on the account management server. For example, the subscribed-to software may receive the information and send a message through network 15 to the account management server to create an account, such as account 23, with the inputted information. The subscription status 24 of such a newly created account may be initially set to a positive value, for example, to "active."

The exemplary computing environment of FIG. 1 separates the features provided by account management server 20 from features provided by web purchase server 30. Such separation is beneficial in certain embodiments. For example, an account management server 20 may experience heavy volume and otherwise be associated with slower response times than are acceptable for billing account features. Thus, billing account features may be provided by a separate server to avoid associating congestion from the heavy volume that may be associated with subscription status validation features.

Separating the features provided by account management server 20 from features provided by web purchase server 30 may also allow such features to be provided by different business entities. For example, a software providing company may make software available and want to itself manage distribution and verification of subscription status, i.e., the functionality provided by maintaining subscription status 24 for verification by a subscription verification module located locally on the device on which the subscribed-to software is used. While such a software provider company may want to provide those features to maintain control over use of its software and may want account information that provides information about the persons and devices using the software, it may be undesirable and/or infeasible for that same software provider company to perform billing services for the associated software subscriptions. Accordingly, a separate web purchase server may be made available by a separate company or other business entity that specializes in or is otherwise able to provide the needed billing functionality.

Accordingly, generally, there may be various benefits to separating account management functionality from billing functionality, for example, by separating such functions on different servers or in providing such functions from separate locations. As depicted in FIG. 1, a web purchase server 30 is provided separate from the account management server 20. The web purchase server may facilitate the purchase, renewal, cancellation, upgrading, and other functions related to obtaining the right to user, continue, or stop using software or features provided by software. An exemplary web purchase server, as shown in FIG. 1, includes billing and subscription information 33 regarding such transactions.

While maintaining account management features separate from billing features can provide certain benefits, it may also present certain issues, concerns, and/or potential disadvantages. For example, a person may pay for a renewal of a software subscription using web purchase server 30 and such payment may not be reflected in the subscription status of the account 23 that the person uses in conjunction with using the subscribed-to software 13 on the device 10. Conversely, a user may upgrade the subscribed-to software 13 on the device 13 in a way that fails to notify the web purchase server 30. Generally, separating account management features from billing features gives rise to the possibility that discrepancies and other synchronization-based errors can be introduced between the separated systems.

In the embodiment of FIG. 1, synchronization server 40 is provided to address such potential discrepancies and thus help enable the separation of account management features and billing features. Generally this involves determining the status of a subscription on the web purchasing server 30 and updating the subscription status 24 of the associated account 23 on the account management server. In certain embodiments, subscription status information on the web purchase server 30 is identified using a serial number that is also associated with the account on the associated account management server 20.

However, in certain circumstances, the serial number used by a web purchase server 30 may not be the same as the serial number used for an account on an account management server 20 that is associated with the same subscription. Such discrepancies may occur, for example, as a result of an update of the subscribed-to software 13 applied on the device 10 that provides a new serial number to the account management server 20. To address such potential discrepancies, the synchronization server 40 may include a serial mapping module 44 as part of its synchronization module 43 that, for example, associates serial numbers amongst different versions of software products licensed under a subscription.

For example, in the preceding exemplary scenario, when the subscribed-to software 13 is updated on device 10, synchronization server 40 receives a message from subscription verification module 14 providing information about the update. This information can be used to create a mapping that is stored, in this example, in database 50 and used by the serial number mapping module 44 to ensure that appropriate subscription status information from the web purchase server 30 is associated with subscription status information on account management server 20 even in circumstances in which the serial numbers for the same subscription stored separately on those servers 20, 30 do not match one another.

In addition, in certain systems, a web purchase server 30 or other billing-related services are provided by a third-party that uses its own serial numbers. In such circumstances, a mapping maintained in database 50 can map those third-party subscription serial numbers to serial numbers provided by a software provider entity, including serial numbers provided by a software service provider entity that are different for different versions of the software product. Generally, mapping of serial number and/or other subscription identifying information can facilitate the synchronization and other back-end functions that may be provided by synchronization server 40.

Figure 2:
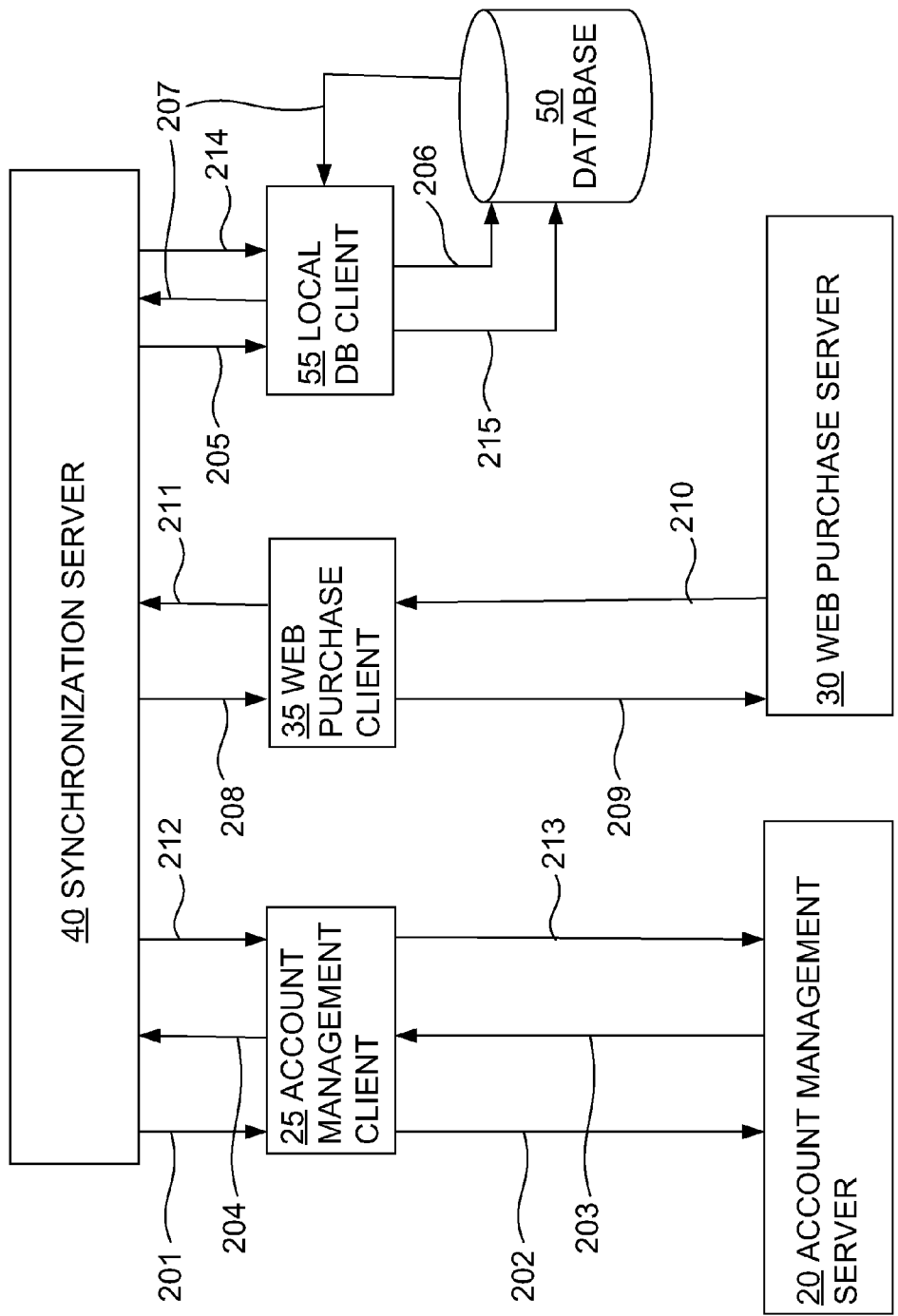
FIG. 2 illustrates an exemplary batch synchronization process.

FIG. 2 illustrates an exemplary batch processing synchronization process in the context of certain of the exemplary system components of FIG. 1. The process begins with synchronization server 40 using a fetch command 201 to cause an account management client 35 to use an application programming interface (API), send a call 202 to retrieve a group of account objects or records from the account management server 20. The records may be identified, in certain embodiments, based on serial numbers associated with the records. The account management server 20 responds by providing the requested records 203 to the user account management client 25 that provides those records 204 to the synchronization server 20.

The synchronization server 40 next checks whether any of the serial numbers have corresponding mapped serial numbers or other identifying information by sending a request 205 to local database client 55 that forwards the request 206 to database 55. Database 50 returns any relevant responses in message 207 which is forwarded through local database client 55 to the synchronization server 40.

The synchronization server 40 next sends request 208 that includes the serial numbers or other appropriate subscription identifying information to a web purchase client 35, which forwards the requests to web purchase server 30. Web purchase server 30 responds by sending a message 210 with updated subscription status information to the web purchase client 35 which forwards the updated status information 211 to the synchronization server.

If updates are required, the synchronization server 40 sends a message 212 with the updated status information to the user account management client 25, which sends a message 213 to the user management server 20. The account management server 20 uses any update information provided to update account information at the account management server 20.

In circumstances in which a serial number or other subscription-identifying information is changed and such change has been provided to the synchronization server 40, it sends a message 14 to the local database client 55, which forwards a message to the database 50, so that database 50 reflects accurate mapping information.

Figure 3:
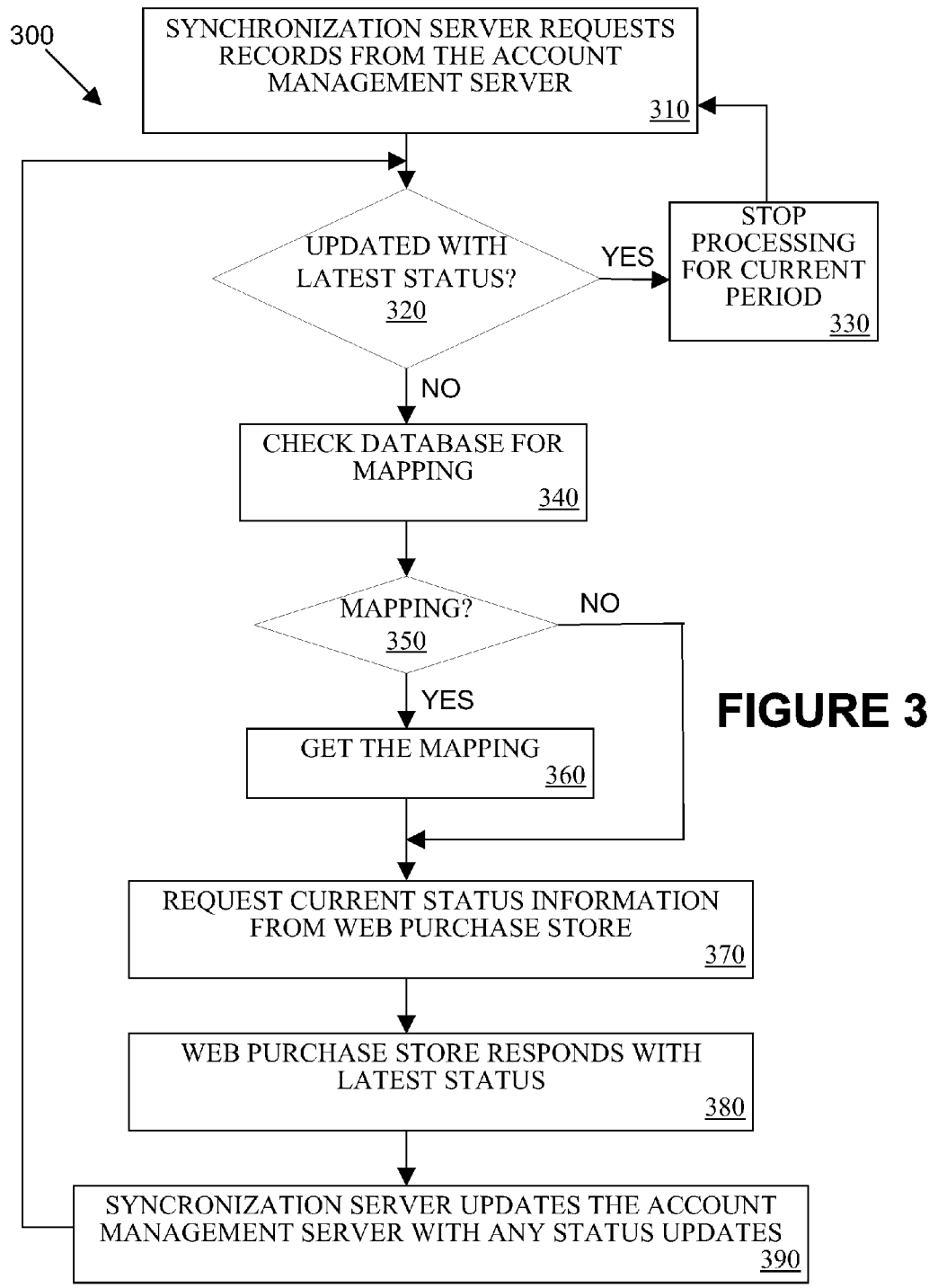
FIG. 3 illustrates another exemplary batch synchronization process.

FIG. 3 illustrates another exemplary batch processing synchronization process as method 300. Method 300 involves a synchronization server such as synchronization server 40 of FIG. 1 requesting records from an account management server, as shown in block 310. The method 300 next involves the synchronization server checking whether the requested records have been updated with the latest status information, as shown in block 320. For example, the synchronization server may check to see if the records have been updated within a designated time period, for example, within the last day. If the records have been updated, as shown in block 330, then the method returns to block 310 to begin the steps of method 300 again at a later time, for example, the following day.

If the records have not been updated with the latest status information the method 300 proceeds from decision block 320 to block 340 to check the database for any applicable mappings. As described above, such mappings may identify alternative subscription-identifying information, such as alternative serial numbers, that should be used to obtain the latest status of a subscription account from a web purchase store. Decision block 350 determines whether such a mapping is available. If no mapping is available, the method skips to block 370. If a mapping is available, however, the method gets the mapping as shown in block 360 prior to proceeding to block 370.

In block 370, the method 300 involves the synchronization server requesting current status information from the web purchase store. The web purchase store responds in block 380 by providing the latest status of any subscriptions identified in the request. The synchronization server can then use that information, as illustrated by block 390, to update the account management server with any status updates. The method 300 then returns to step 320 to check additional records received in response to the request for records of block 310.

Figure 4:
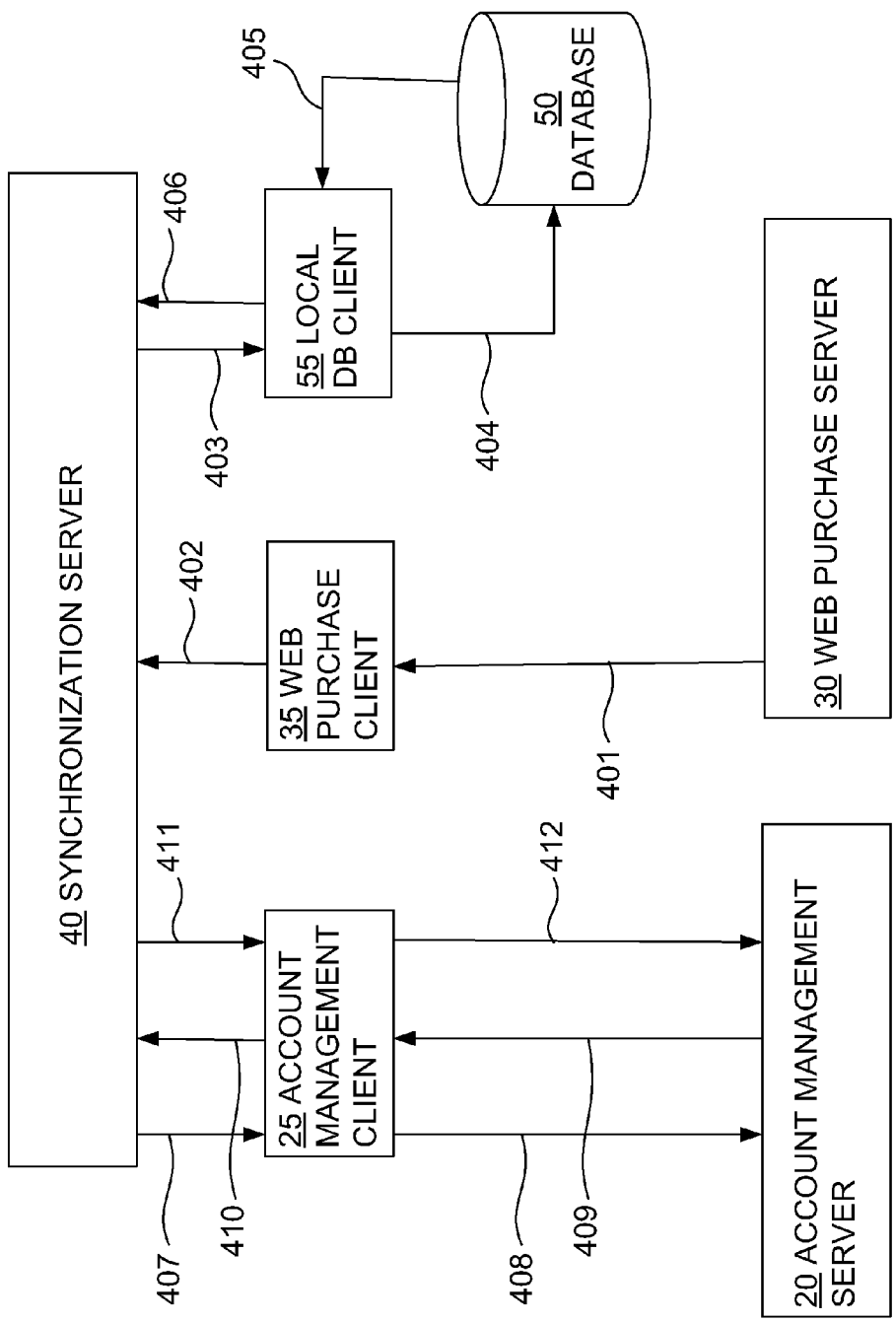
FIG. 4 illustrates an exemplary event-driven synchronization process.

FIG. 4 illustrates an exemplary event-driven synchronization process illustrated in the context of certain of the exemplary system components of FIGS. 1 and 2. The process begins when an event at the web purchase server 30 causes a change in a subscription status. Any activity on the subscription could provide a trigger. Exemplary events include subscription cancellation and subscription renewal.

After the occurrence of such an event, a message 401 is sent to the web purchase client 35 and provided as information 402 to the synchronization server 40. The messages could be e-mails or any other type of electronic message. In one exemplary embodiment, messages are accumulated and sent as a group. For example, ten messages could be pooled together prior to being sent to the synchronization server 40. The synchronization server receives the information 402 and requests any relevant mappings using messages 403, 404 and receives from database 50 any relevant mappings through messages 405, 406.

The synchronization server 40 then uses the updated status information received from web purchase server 30 and any relevant mapping information from database 50 to update the account management server 20. In this example, messages 407, 408 request the account records corresponding to records that may need to be updated, i.e., those corresponding to subscriptions the status of which was updated at web purchase server 30. The management account server responds by providing the requested records, which are sent in messages 409 and 410. The synchronization server 40 then updates the records and returns the updated records in messages 411, 412 to the account management server 20.

An event-triggered synchronization technique such as the one provided in this example can be used to ensure that any change in subscription account status is synchronized quickly and may be particularly appropriate in circumstances in which it is desirable to ensure that an account management server is updated immediately with the latest subscription status information.

FIG. 5 is a flow chart of an exemplary method 500 for updating information stored at a device used for account management of a subscription for a software product. The exemplary method 500 could be implemented in a variety of computing environments, and, as an example could be implemented in the environment depicted in FIG. 1 wherein one or more of the exemplary server devices 20, 30, 40 depicted in FIG. 1 provide one more of the steps of the exemplary method 500 depicted in FIG. 5.

The exemplary method 500 of FIG. 5 involves providing a synchronization device for updating information stored at a device used for account management of a software product subscription, as shown in block 510. A synchronization device may be a server. In the exemplary environment of FIG. 1, synchronization server 40 could be provided as the synchronization device of block 510 of FIG. 5. A device used for account management that is updated by the synchronization device could be, as an example, the account management server 20 depicted in FIG. 1. As an example, in the exemplary environment depicted in FIG. 1, the subscription status 24 of the account 23 for a subscription stored at an account management server 20 is accessed by a device 10 over a network 15 to identify whether, based on subscription status 24 for the account 23, the computer device 10 will provide functionality of a subscribed-to software 13 on the computer device 10.

In alternative embodiments, a synchronization device and a device used for account management can be maintained as parts of a single computer device or maintained locally to one another. However, in other embodiments, it may be preferable to separate a synchronization device and a device used for account management from one another functionally and/or physically to provide separate and dedicated processing, improve response time, and/or provide other benefits.

The exemplary method 500 of FIG. 5 further involves receiving a status of the subscription at the synchronization device, the status received from a device that provides billing transactions associated with the subscription, as shown in block 510. Generally, such billing transactions alter the status of the subscription and thus can result in subscription status updates that are not otherwise recognized by the device used for account management. Receiving the status of the subscription at the synchronization device may involve receiving information about a single subscription or, as an exemplary alternative, may involve receiving a single message that comprises status information for a plurality of subscriptions as a batch.

Receiving the status of the subscription from a device that provides billing transactions may or may not occur in response to a request sent from the synchronization device to the device that provides billing transactions. Such a request may comprise identification information recognizable by the device that provides billing transactions. The device used for account management may recognize different identification information to identify the associated account. To address such potential differences, the synchronization server may access a mapping that associates the identification information recognizable by the device that provides billing transactions and the different identification information recognized by the device used for account management. In one exemplary scenario, this mapping facilitates issues created by different serial numbers used for different software product versions. For example, an account management device may have a more recent serial number than a device used for billing transactions and such a mapping may allow synchronization of status information between the devices even in the absence of common subscription identification information.

The web purchase server 3 depicted in FIG. 1 provides an example of a device that provides billing transactions associated with the subscription. Such a device may provide a web interface that offers a user interface for completing such transactions and may store or otherwise maintain information about those transactions and the associated subscription or subscriptions.

The exemplary method 500 of FIG. 5 further involves updating a status of an account for the subscription stored at the device used for account management, as shown in block 530. The status of the account is updated based at least in part on the status of the subscription received from the device that provides billing transactions associated with the subscription.

In one exemplary embodiment, updating the status of the account for the subscription involves receiving, at the synchronization server, a record from the device used for account management, the record identifying a previously-stored status of the account for the subscription. If the previously-stored status of the account for the subscription differs from the status of the subscription received from the device that provides billing transactions, the synchronization server creates an updated record and sends the updated record to the device used for account management.

An account management server can also be used to keep track of machines that can use a particular software product under a subscription. Accordingly, certain embodiments further provide device functionality that improves the ability to use subscribed-to software and/or establish, modify, and cancel subscriptions with respect to particular computing devices. In one embodiment, a person is presented with an option to add a current device to a subscription. For example, if two other devices are already associated with a subscription, the user, from a third device, is able to easily, and perhaps with a single command, activate the account with respect to the third machine and deactivate the account with respect to a selected one of the other two machines. This feature can provide significant benefits in circumstances in which the number of devices allowed to be associated with the subscription is limited. If a limited number of devices are allowed to use the software under the subscription, and a new device attempts to use the subscription, the device's associated with the subscription may be changed in response to a single input, e.g., by a single mouse click, that deactivates one or more other devices and activates the new device with respect to the use under the subscription.

General

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A computer-implemented method comprising:
   providing a synchronization device configured for updating information stored at a first device configured for determining whether a subscription for performing at least one function of a software product is authorized, wherein the synchronization device is separate from the first device and accesses the first device over a network, wherein the first device identifies the subscription based on a first serial number;
   receiving, by the synchronization device, billing transaction information regarding the subscription from a second device, wherein the second device is configured to manage billing transactions associated with the subscription, wherein the second device identifies the subscription based on a second serial number different from the first serial number and the billing transaction information comprises the second serial number, wherein the second device is separate from the first device and the synchronization device and is accessible by the synchronization device over a network;
   determining, by the synchronization device, that the billing transaction information including the second serial number corresponds to the subscription identified by the first device using the first serial number;
   determining, by the synchronization device, a status of the subscription based on the billing transaction information; and
   based on determining the status of the subscription, generating, by the synchronization device, information for updating a status of an account for the subscription at the first device, wherein the information for updating the status of the account includes the first serial number;
   providing, by the synchronization device, the information for updating the status of the account to the first device.

2. The computer-implemented method of claim 1, wherein the status of the account stored at the first device is accessed by a third device over the network to identify whether, based on the status of the account, the third device is authorized provide functionality of the software product.

3. The computer-implemented method of claim 1, wherein the synchronization device receives the status of the subscription from the second device over the network and the synchronization device provides the information for updating the status of the account stored at the first device by sending a message to the first device over the network.

4. The computer-implemented method of claim 1,
   wherein determining the status of the account for the subscription comprises:
      receiving, at the synchronization device, a record from the first device, the record identifying a previously-stored status of the account for the subscription,
      comparing, by the synchronization device, the previously-stored status of the account with the billing transaction information, and
      determining that the previously-stored status of the account is different from the billing transaction information;
   wherein the information for updating the status of the account is generated based on the previously-stored status of the account being different from the information about the status of the subscription received from the second device, wherein generating the information for updating the status of the account comprises creating an updated record and sending the updated record to the first device.

5. The computer-implemented method of claim 1, further comprising providing, by the synchronization device, a request to the second device regarding the status of the subscription, wherein receiving the status of the subscription from the second device occurs in response to the request sent from the synchronization device to the second device.

6. The computer-implemented method of claim 1, wherein determining that the billing transaction information including the second serial number corresponds to the subscription identified by the first device using the first serial number comprises:
    accessing, by the synchronization device, a mapping that associates the first serial number with the second serial number; and
    adding the identification information recognizable by the second device to the request based on the mapping.

7. The computer-implemented method of claim 6, wherein each of the first serial number with the second serial number respectively identifies a different version of the software product.

8. The computer-implemented method of claim 1 wherein the information received by the synchronization device from the second device comprises a single message that comprises status information for a plurality of subscriptions as a batch.

9. The computer-implemented method of claim 1 wherein the billing transactions provided by the second device comprise:
    a first transaction type that establishes a new subscription;
    a second transaction type that renews an existing subscription; and
    a third transaction type that cancels the existing subscription.

10. The computer-implemented method of claim 1 wherein the information received by the synchronization device from the second device has a value selected from the group consisting of active, suspended, and expired.

11. The computer-implemented method of claim 1, wherein determining the status of the subscription comprises:
    determining, based on communication with the first device, that a previous operation to determine the status of the subscription was performed outside of a specified time period;
    identifying the second device configured to manage the billing transactions associated with the subscription in response to determining that the previous operation to determine the status of the subscription was performed outside of a specified time period;
    requesting the information about the subscription from the second device; and
    comparing the information about the subscription with information about the subscription stored at the synchronization device.

12. The computer-implemented method of claim 11, wherein identifying the second device configured to manage the billing transactions comprises mapping first identification information describing the subscription and received from the first device to second identification information describing the subscription and received from the second device.

13. The computer implemented method of claim 12, further comprising:
    determining, based on a message received from a third device configured to execute the software product, that identification information for the software product has been modified to include one of the first identification information or the second identification information to the software product;
    in response to determining that the identification information for the software product has been modified to include one of the first identification information or the second identification information to the software product, accessing data stored at the synchronization device that includes the other of the first identification information or the second identification information;
    modifying the data to include a mapping between the first identification and the second identification information.

14. The computer-implemented method of claim 1, wherein each of the synchronization device, the first device, and the second device comprises a respective one or more devices that are logically identified as a respective common server system.

15. A non-transitory computer-readable medium on which is encoded program code, the program code comprising:
    program code for configuring a synchronization device to provide a service for updating information stored at a first device configured for determining whether performing at least one function of a subscription for a software product is authorized, wherein the synchronization device is separate from the first device and accesses the first device over a network, wherein the first device identifies the subscription based on a first serial number;
    program code for receiving, by the synchronization device, billing transaction information regarding the subscription from a second device, wherein the second device is configured to manage billing transactions associated with the subscription, wherein the second device identifies the subscription based on a second serial number different from the first serial number and the billing transaction information comprises the second serial number, wherein the second device is separate from the first device and the synchronization device and is accessible by the synchronization device over a network;
    program code for determining, by the synchronization device, that the billing transaction information including the second serial number corresponds to the subscription identified by the first device using the first serial number;
    program code for determining, by the synchronization device, a status of the subscription based on the billing transaction information; and
    program code for generating, by the synchronization device, information for updating a status of an account for the subscription at the first device, at the first device, wherein the information for updating the status of the account includes the first serial number;
    program code for providing, by the synchronization device, the information for updating the status of the account to the first device.

16. The computer-readable medium of claim 15, wherein the status of the account for the subscription stored at the first device is accessed by a third device over the network to identify whether, based on the status of the account for the subscription, the third device is authorized provide functionality of the software product on the third device.

17. The computer-readable medium of claim 15 wherein the program code further comprises:
    program code for receiving, at the synchronization device, a record from the first device, the record identifying a previously-stored status of the account for the subscription;
    program code for, if the previously-stored status of the account for the subscription differs from the status of the subscription received from the second device, creating an updated record and sending the updated record to the first device.

\* \* \* \* \*